United States Patent [19]

Phillips

[11] Patent Number: 5,447,361

[45] Date of Patent: Sep. 5, 1995

[54] PORTABLE DUMPING INSERT FOR A PICKUP TRUCK

[75] Inventor: Kirt Phillips, Washougal, Wash.

[73] Assignee: Workhorse, Inc., Washougal, Wash.

[21] Appl. No.: 329,229

[22] Filed: Oct. 26, 1994

[51] Int. Cl.⁶ .............................. B60P 1/04; B60P 1/12
[52] U.S. Cl. ................................. 298/1 A; 298/19 V; 298/18
[58] Field of Search ............... 298/1 A, 1 B, 19 V, 298/21 V, 22 B, 22 F; 410/151

[56] References Cited

U.S. PATENT DOCUMENTS

| | | | |
|---|---|---|---|
| 1,336,163 | 4/1920 | Settlage | 298/19 V |
| 2,033,209 | 3/1936 | Teetor | 298/19 V |
| 3,411,825 | 11/1968 | Fulton | 298/1 A |
| 3,740,097 | 6/1973 | Parker et al. | 298/1 A |
| 4,236,854 | 12/1980 | Rogers | 410/151 |
| 4,418,959 | 12/1983 | Dunlap | 298/19 V |
| 4,834,599 | 5/1989 | Gordon et al. | 410/151 |

FOREIGN PATENT DOCUMENTS 945702 12/1948 France ......................... 298/21 V

*Primary Examiner*—Michael S. Huppert
*Assistant Examiner*—Douglas A. Hess
*Attorney, Agent, or Firm*—Chernoff, Vilhauer, McClung & Stenzel

[57] ABSTRACT

A detachable dumping apparatus comprises a frame including a pair of spaced-apart elongate rails. A rearwardly disposed hitch is attached to the frame and adjustably attachable to the rear bumper of the pickup truck. A plurality of adjustable biasable stabilizer legs are attached to the frame for exerting an outwardly biasing force against each side of the bed of the pickup truck. A bucket having a substantially trapezoidal cross-section is pivotally connected to the frame. At least one arm having first and second ends, wherein the first end is slidably attached to one of the rails and the second end is attached to the bucket. A cable is connected to the first end of the arm for sliding the arm along one of the rails to cause the bucket to pivot with respect to the frame and a winch is operatively connected to the cable.

6 Claims, 6 Drawing Sheets

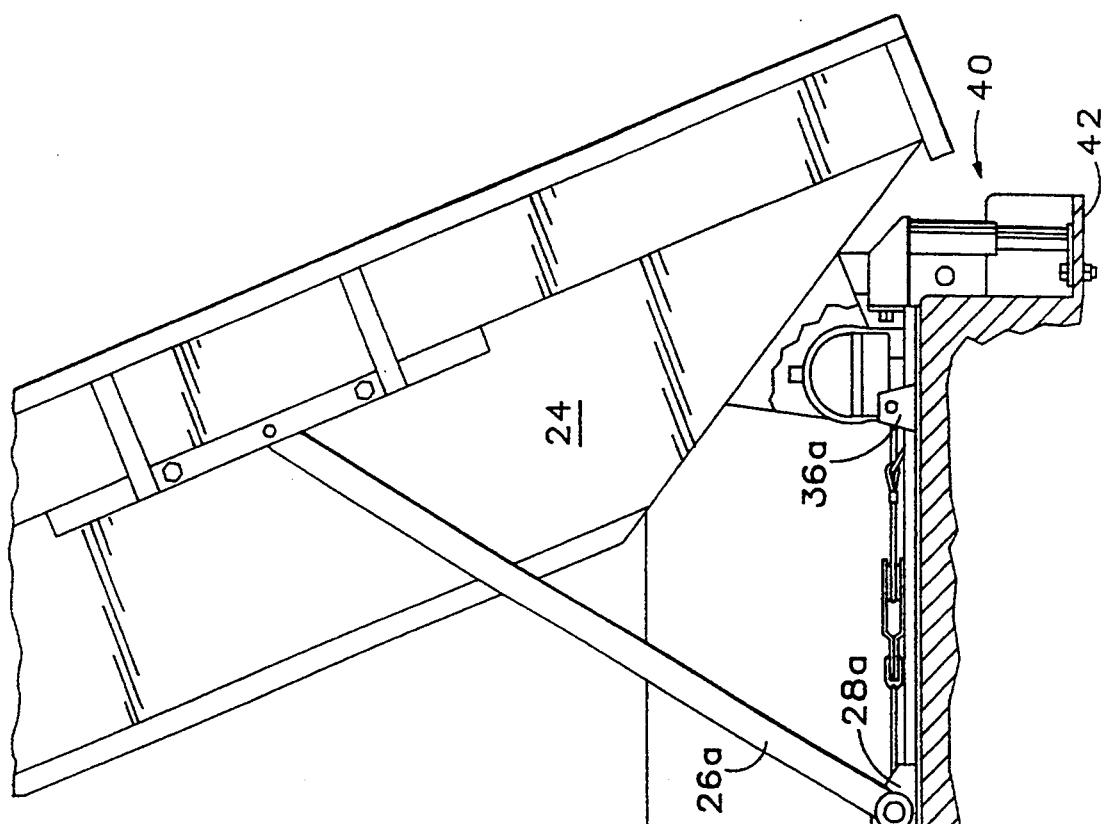
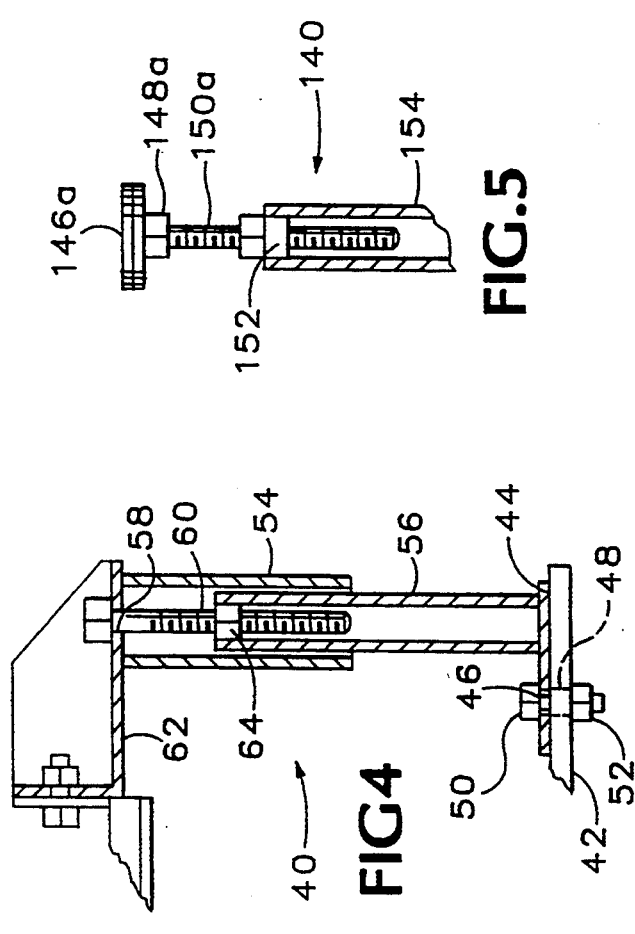
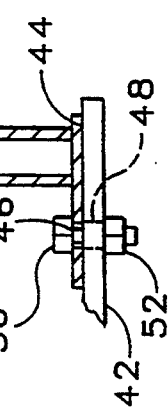

PORTABLE DUMPING INSERT FOR A PICKUP TRUCK

BACKGROUND OF THE INVENTION

The present invention relates to a detachable dumping apparatus for adaptation to a pickup truck.

Large dedicated dump trucks for transport and dumping of materials are known. Although dedicated dump trucks are efficient, they are prohibitively expensive for occasional use.

To provide a less expensive alternative to the purchase or lease of a dedicated dump truck, trucks may be retrofitted with a dumping container. Day, U.S. Pat. No. 4,126,357, discloses a flat-bottomed dumping container pivotally affixed to a T-shaped bracing structure, that is in turn attachable with bolts to a truck bed. A hydraulic ram is pivotally connected between the bracing structure and the underside of the dumping container, which upon extension inclines the dumping container to empty its contents. However, holes must be drilled into the truck bed to receive the bolts of the bracing structure, leaving visible holes when the bracing structure is detached from the truck bed. Furthermore, it is difficult work to align, tighten and loosen the bolts.

Panciocco, U.S. Pat. No. 3,471,045, discloses a flat-bottomed dumping container that slides on channels welded or bolted to the upright sides of a truck bed. To dump its contents, the container is rolled rearwardly and pivoted. After dumping, the container is returned to its initial position. Wright, U.S. Pat. No. 1,942,319, discloses a flat-bottomed dumping container that is pivotally attached to a pair of beams that are in turn attached to a supporting frame on a truck bed. One end of each arm is connected to rollers located on the beams, and the other end of each arm is attached to the flat-bottomed dumping container. A rotatable drum is connected by cable to the rollers. Rotating the drum pulls the rollers along the pair of beams to incline the dumping container about its pivot point to empty its contents. Panciocco's teaching of welding or bolting the channels to the walls of the truck bed and Wright's teaching of mounting the dumping container to a supporting frame, both result in dumping containers that are not readily detachable from the truck.

Therefore, what is needed is an easily attachable and detachable dumping apparatus that can be widely used with lighter duty trucks such as pickup trucks without modifications to the truck bed, and that is of a sufficiently universal design to permit its use on a wide variety of different trucks. These needs and others are met by the present invention, which is described in detail below.

SUMMARY OF THE INVENTION

The present invention overcomes the aforementioned drawbacks of the prior art by providing a dumping apparatus adapted for easy attachment to and detachment from a pickup truck. The dumping apparatus comprises a frame which includes a pair of spaced-apart elongate rails to which a rearwardly disposed hitch is attached. The hitch is also adjustably attachable to the rear bumper of the pickup truck. A plurality of adjustable biasable stabilizer legs are attached to the frame for exerting an outwardly biasing force against each side of the bed of the pickup truck to maintain the position of the bucket. The bucket has a substantially trapezoidal cross-section and is pivotally connected to the frame. A winch operatively connected to a cable is attached to the first end of an arm having first and second ends, the first end being slidably attached to one of the rails and the second end being attached to the bucket. Sliding the arm along one of the rails causes the bucket to pivot with respect to the frame.

The present invention provides numerous advantages over previous designs. The rearwardly disposed adjustably attachable hitch allows the same frame to be secured to trucks of dissimilar design, each of which may have a different height from the rear bumper to the bed of the truck, without having to redesign the frame for each truck. Further, the same hitch permits the entire dumping assembly to be easily secured to the frame of the pickup truck through its bumper.

Biasable stabilizer legs attached to the frame exert an outwardly directed biasing force against the sides of the pickup bed to maintain the proper orientation of the frame within the bed of the truck. Also, the biasable stabilizer legs secure the frame in place without requiring modifications to the truck bed. The base assembly, which includes the frame and the combination of the hitch and biasable stabilizer legs, allows the dumping apparatus to be easily attached and detached both prior to and after use. Further, the base assembly eliminates any need to make permanent alterations to the truck, such as by drilling holes in the truck bed.

The bucket has a trapezoidal shape including forward and rearward inclined ends. When the bucket is raised, the rearward inclined end extends past the rear bumper of the truck, dumping materials away from the truck. Because of the clearance provided, the forward inclined end permits a portion of the supporting structure to be located underneath the forward inclined end of the bucket.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 2 is a side view of the exemplary embodiment shown in FIG. 1, with the bucket shown in a raised position, and a portion of the bucket broken away to show a winch.

FIG. 4 is an enlarged view, shown in partial section, of the adjustably attachable hitch of the dumping apparatus.

FIG. 5 is an enlarged view, shown in partial section, of the adjustable biasable stabilizer leg of the dumping apparatus.

DETAILED DESCRIPTION OF THE PREFERRED EMBODIMENT

Figure 1:
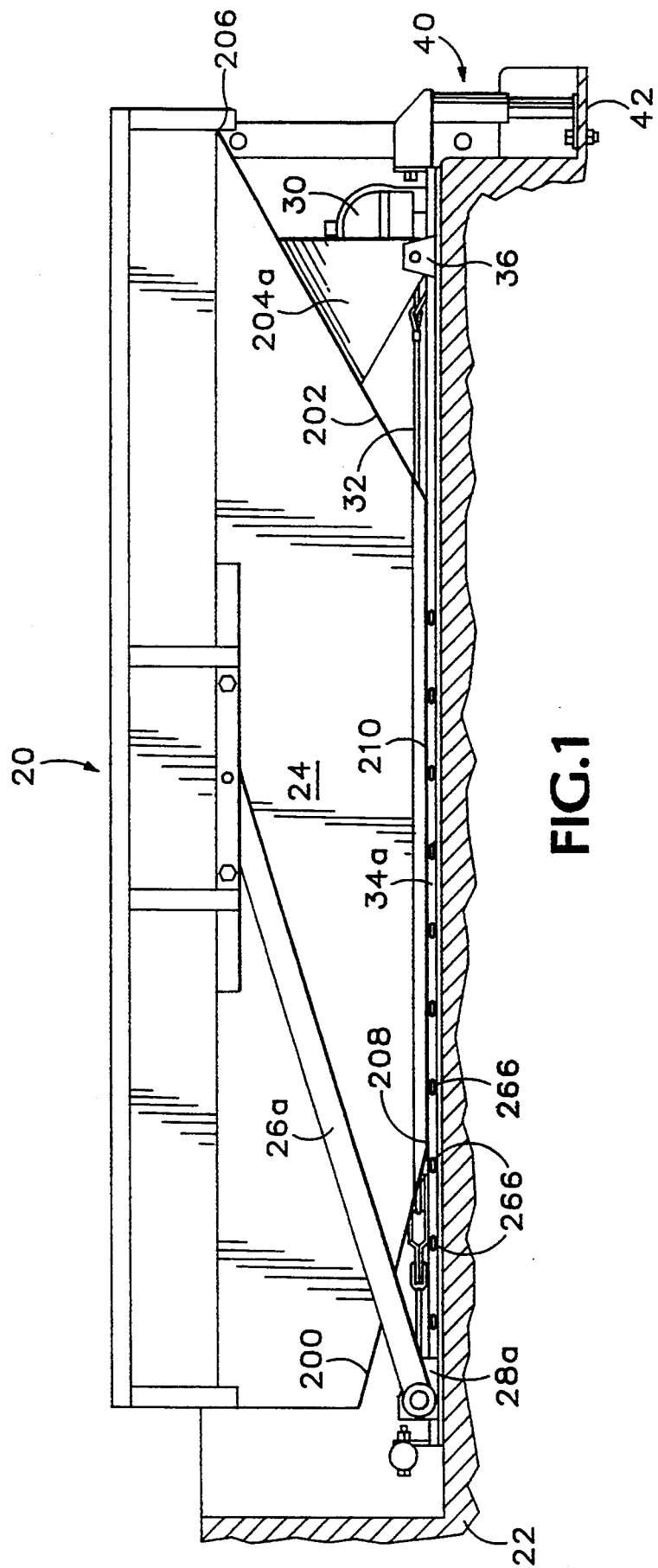
FIG. 1 is a side view of an exemplary embodiment of the dumping apparatus of the present invention, attached to a pickup truck bed shown in section, with the bucket in a lowered position.

First, a general functional description of the dumping apparatus will be provided, followed by details of the dumping apparatus. Referring to FIG. 1, the detachable dumping apparatus 20 is located within the pickup truck bed 22. The dumping apparatus 20 primarily comprises a bucket 24 wherein materials are held for transport and dumping, and a pair of arms 26a and 26b located on each side of the bucket 24. Each arm 26a and 26b is pivotally connected both to the bucket 24 and to respective sliding blocks 28a and 28b located on respective rails 34a and 34b. A winch 30 exerts a pulling force upon cable 32 to force sliding blocks 28a and 28b to slide along rails 34a and 34b, thereby inclining the bucket 24 about a pair of pivot points 36a and 36b, allowing the contents of the bucket 24 to be dumped, as shown in FIG. 2.

Figure 3:
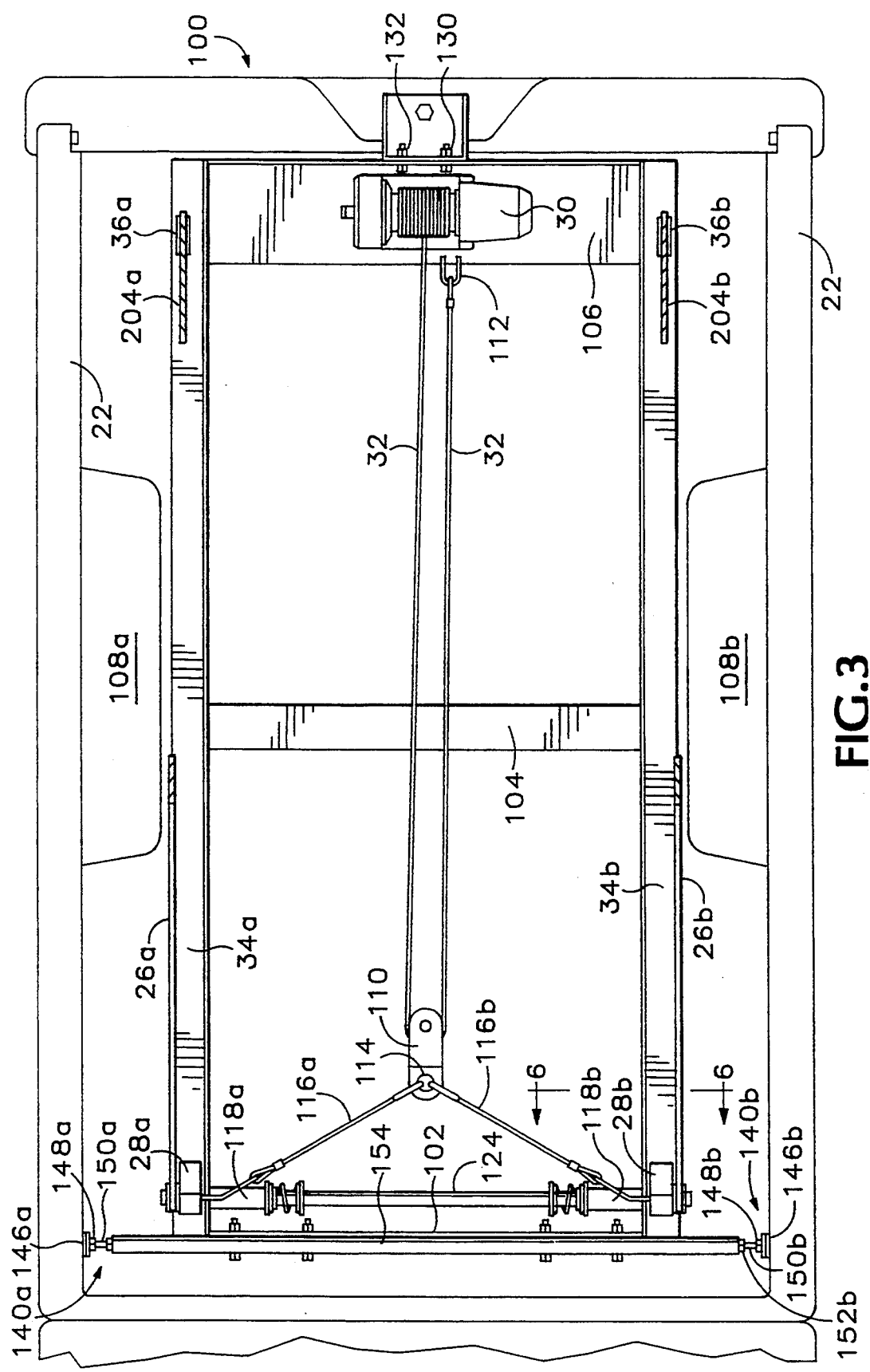
FIG. 3 is a top plan view of the dumping apparatus, with the bucket removed and a breakaway as viewed from the front of the truck.

Referring to FIG. 3, a frame 100 includes a pair of parallel spaced-apart rails 34a and 34b that are retained in alignment by three transverse spacers affixed between rails 34a and 34b, namely a forward spacer 102, a middle spacer 104 and a rearward spacer 106. The distance the rails 34a and 34b are spaced-apart by the spacers 102, 104 and 106 is designed to allow them to fit within inside wheel housings 108a and 108b of the pickup bed 22. A winch 30, or other suitable device, is securely bolted in a transverse alignment on the rearward spacer 106. The cable 32 wound on the winch 30 extends through a pulley 110 and is tied off to a U-shaped loop 112 affixed to the rearward spacer 106. Alternatively, the cable 32 could be tied directly to the pulley 110, eliminating the length of cable 32 from the pulley 110 to the U-shaped loop 112. One end of each cable 116a and 116b is connected to an eyelet 114 defined by the pulley 110. The other end of each of the cables 116a and 116b is connected to respective braking mechanisms 118a and 118b.

The braking mechanisms 118a and 118b (the function of which will be described below) are supported on a round bar 124 connected between the sliding blocks 28a and 28b to maintain their spaced-apart relationship on the rails 34a and 34b. Each brake mechanism 118a and 118b engages a corresponding sliding block 28a and 28b contained within the U-shaped cross-section of rails 34a and 34b. A pair of arms 26a and 26b are rotatably connected to sliding blocks 28a and 28b. Winding the cable 32 onto the winch 30 forces the sliding blocks 28a and 28b to slide along the rails 34a and 34b toward the rear of the truck bed 22. A force in the direction of the cables 116a and 116b is exerted on the sliding blocks 28a and 28b during rearward movement. However, round bar 124 maintains the position of sliding blocks 28a and 28b on rails 34a and 34b, thus preventing them from skewing, which would otherwise impede their movement on the rails 34a and 34b. While sliding blocks 28a and 28b slide rearwardly, arms 26a and 26b pivot and raise the rear of bucket 24. Bucket 24 pivots about pivot points 36a and 36b while being raised to dump its contents, as shown in FIG. 2. After the contents of the bucket 24 are dumped, cable 32 is gradually let out, allowing the weight of bucket 24 to force sliding blocks 28a and 28b to slide forward on the rails 34a and 34b until bucket 24 has reached its original lowered position, as shown in FIG. 1.

To maintain the frame 100 from moving rearwardly off the truck bed 22, and to secure the rear of the frame 100 from moving in a transverse direction, a rearwardly disposed hitch 40 is secured with bolts 130 and 132 to the frame 100, and to the rear bumper 42 with a bolt 50. Referring to FIG. 4, the hitch 40 includes a lower phalange 44 that defines a hole 46 that is positioned in alignment with a hole 48 in the rear bumper 42. The hole 48 is present in the majority of pickup trucks' rear bumpers 42 for the attachment of a trailer ball. The bolt 50 is placed through both holes 46 and 48 to hold the flange 44 on the rear bumper 42 and is secured with a nut 52. Alternatively, the hitch 40 could be secured to the rear bumper 42 by any other suitable method, such as a clamp. The hitch 40 includes an upper tubular member 54 that telescopes over a lower tubular member 56. An adjustment bolt 60 is placed through a hole 58 in a top plate 62 and is threaded through a nut 64 that is affixed to the top center of the lower tubular member 56. Turning the bolt 60 telescopes the upper tubular member 54 down over the lower tubular member 56, decreasing the height of the hitch 40. The bolt 60 is turned until a sufficient force is exerted between the frame 100 and the rear bumper 42 to secure the frame 100 in place. The adjustable height function of the hitch 40 accommodates different distances between the truck bed 22 and the rear bumper 42, which often varies with truck models. In addition, the hitch 40 is removable from the rear bumper 42 simply by removing the bolt 50.

Referring to FIG. 3, to maintain the front of the frame 100 in the proper orientation within the truck bed 22, a pair of adjustable biasable stabilizer legs 140a and 140b are attached to a hollow bar 154 affixed to the forward spacer 102. Legs 140a and 140b exert an outwardly biasing force against each side of the truck bed 22. Referring to FIG. 5, stabilizer leg 140a, which is the same as stabilizer leg 140b, is shown in detail. Stabilizer leg 140a includes a pressure pad 146a with a nut 148a affixed on its inside surface. One end of a threaded rod 150a is screwed into securement with nut 148a, and the other end of rod 150a is threaded through a nut 152a affixed to the end of hollow bar 154. The stabilizer leg 140a can be extended or retracted simply by turning pad 146a. After positioning frame 100 on truck bed 22 and securing the hitch 40, stabilizer legs 140a and 140b are extended outwardly by turning the pads 146a and 146b to exert an outwardly directed pressure on both sides of the truck bed 22. Stabilizer legs together act to restrain the frame 100 from sliding on truck bed 22. Pads 146a and 146b are secured to the sides of truck bed 22 by friction so that no modifications are required to the truck bed 22. The base assembly, which includes the frame and the combination of the hitch and biasable stabilizer legs, allows the dumping apparatus to be easily and securely attached prior to use and easily detached after use.

Bucket 24 has a trapezoidal shape, including forward and rearward inclined ends 200 and 202. Affixed to the bottom of the rearward inclined end 202 are a pair of fins 204a and 204b connected with bolts to respective pivot points 36a and 36b. The bucket 24 is raised by the force applied by the arms 26a and 26b pivoting the bucket 24 about the pivot points 36a and 36b. As the bucket is raised the lip 206 of the rearward inclined end 202 extends out over the end of the truck to dump materials past the rear bumper 42. The rearward inclined end 202 allows space for the winch 30 to be centrally located on the rearward spacer 106 directly underneath a portion of the bucket 24. If the winch 30 were located underneath a box-style bucket, then the entire bucket would have to be raised, resulting in a higher center of gravity for the truck. The forward inclined end 200 allows enough space for a portion of the frame 100 to be positioned there-under and further permits material at the junction 208 of the forward inclined end 200 and the bottom 210 of the bucket 24 to flow out easily when bucket 24 is raised. The bucket's inclined ends 200 and 202 allow the length of the bucket to be increased by eliminating wasted space required to locate supporting structure on the truck bed 22 past either end of the bucket 24.

Figure 6:
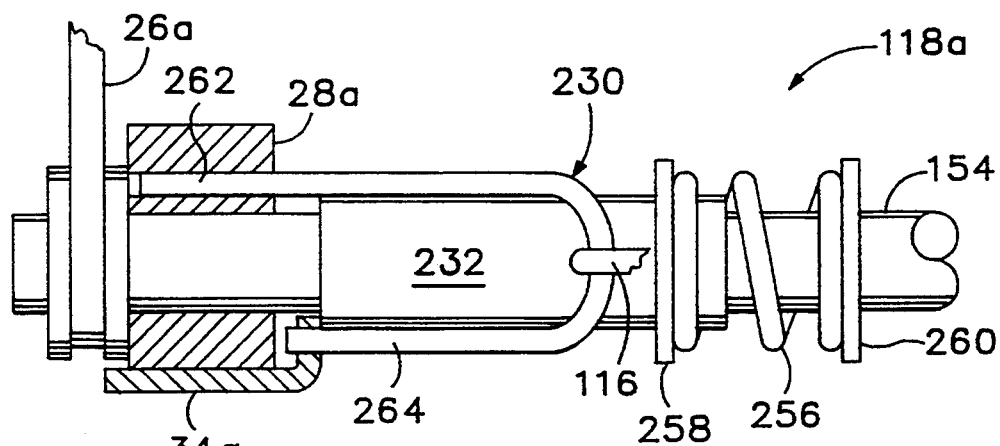
FIG. 6 is an enlarged partial sectional view of a braking mechanism for the dumping apparatus shown in the locked position.
Figure 7:
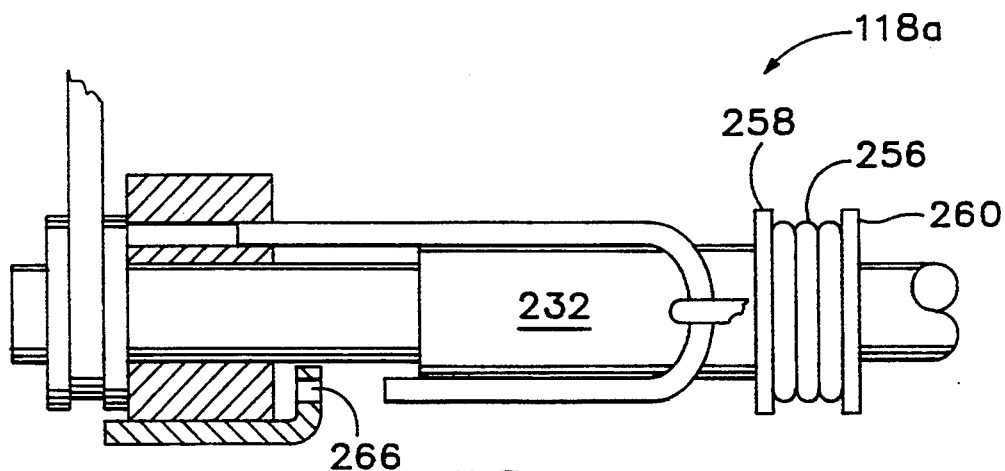
FIG. 7 is another enlarged partial sectional view of the braking mechanism shown in FIG. 6, shown in the unlocked position.

Referring to FIG. 6, braking mechanisms 118a and 118b include a U-shaped bar 230 that is bent toward pulley 110, as shown in FIG. 3. The U-shaped bar 230 is fastened to a sleeve 232 that freely slides over hollow bar 154. When cable 116a does not exert a sufficiently strong force on the U-shaped bar 230, spring 256 presses against a flange 260 connected to hollow bar 154, thereby sliding sleeve 232 outwardly by pressing against flange 258 connected to sleeve 232. When sleeve 232 is extended outward, the retaining end 262 and the lockable end 264 of the U-shaped bar 230 are engaged within sliding block 28a and the rail 34a. The lockable end 264 engages one of a series of oblong-shaped openings 266 in rail 34a, preventing movement of the hollow bar 154 with respect to rail 34a. Retaining end 262 is engaged in a hole in sliding block 28a, preventing sliding block 28a and arm 26a from moving with respect to rail 34a. Referring to FIG. 7, when winch 30 exerts a sufficient force on the cable 216 pulling the U-shaped bar 230, the flange 258 compresses the spring 256 against the flange 260, thereby moving the braking mechanism 118a into an unlocked position. In the unlocked position, the lockable end 264 is disengaged from rail 34a, while retaining end 262 is still engaged with sliding block 28a. When unlocked the sliding block 28a may move with respect to the rail 34a. In both the locked position, shown in FIG. 6, and the unlocked position, shown in FIG. 7, retaining end 262 is engaged with sliding block 28a to maintain the braking mechanism's position with respect to hollow bar 154 and to resist turning on hollow bar 154, which could move lockable end 264 out of alignment with openings 266. If bucket 24 is lowered too quickly, or a malfunction occurs causing the bucket 24 to fall freely, braking mechanisms 118a and 118b will engage openings 266, stopping the bucket's fall to prevent potential injury.

Figure 8:
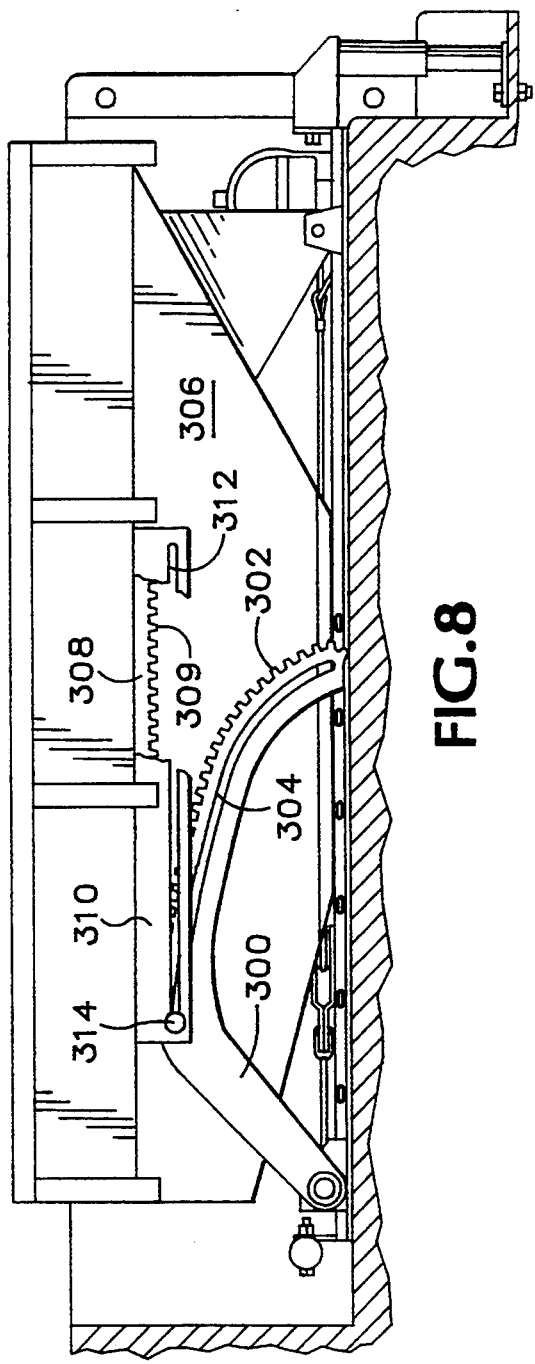
FIG. 8 is an alternative embodiment of the present invention, with the bucket in the lowered position, an arm including teeth, and the bucket including a toothed beam shown with a portion broken away.
Figure 9:
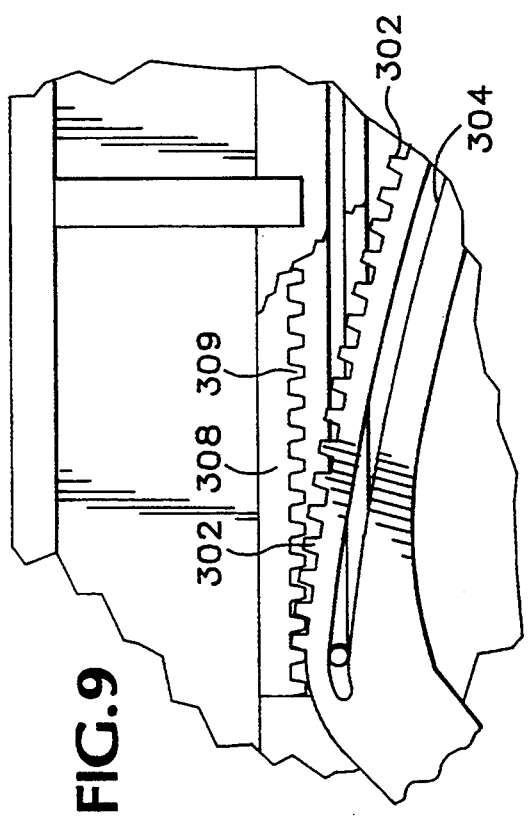
FIG. 9 is an enlarged view of the arm and beam of FIG. 8, with a portion broken away to show the teeth meshing.
Figures 10, 11:
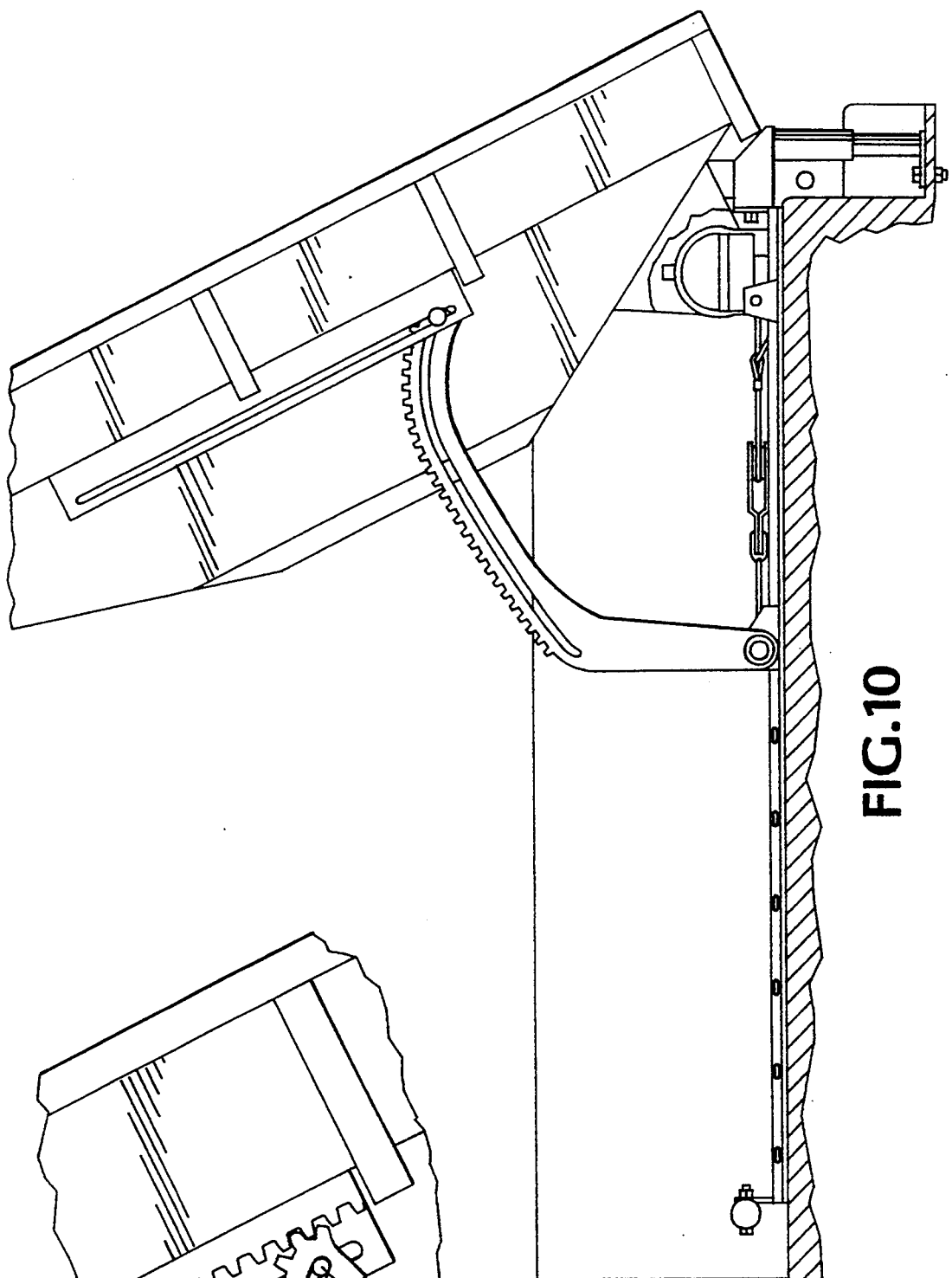
FIG. 10 is the alternative embodiment shown in FIG. 8, with the bucket in the raised position and a portion of the bucket broken away to show the winch.
FIG. 11 is an enlarged view of the arm and beam shown in FIG. 10, with a portion broken away.

Referring to FIG. 8, an alternative embodiment of the present invention entails replacing straight arms 26a and 26b with a set of curved arms 300 (the second arm is not shown) that include sets of teeth 302 and slotted openings 304. The bucket 306 includes two beams 308 with corresponding teeth 309 and two cover plates 310 with slotted openings 312. Pins 314 extend through slotted openings 304 and 312 to maintain arms 300 in engagement with beams 308. The sets of teeth 302 and 309 are sized and positioned to engage each other as more clearly shown in FIG. 9. As cable 32 is pulled by winch 30, sets of teeth 302 and 309 engage each other, as shown in FIG. 10, causing bucket 306 to be raised. When bucket 306 is fully raised, pins 314 are at the end of slotted openings 312, as shown in FIG. 11.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A detachable dumping apparatus adapted for attachment to the bed of a pickup truck, comprising:
   (a) a frame comprising a pair of spaced-apart elongate rails;
   (b) a rearwardly disposed hitch attached to said frame and adjustably attachable to the rear bumper of said pickup truck;
   (c) a plurality of adjustable biasable stabilizer legs attached to said frame for exerting an outwardly biasing force against each side of the bed of said pickup truck;
   (d) a bucket having a substantially trapezoidal cross-section, said bucket pivotally connected to said frame;
   (e) at least one arm having first and second ends, said first end slidably attached to one of said rails and said second end attached to said bucket;
   (f) a cable connected to said first end of said arm for sliding said arm along one of said rails to cause said bucket to pivot with respect to said frame; and
   (g) a winch operatively connected to said cable.

2. The dumping apparatus of claim 1 further comprising a pair of arms each having first and second ends, said first end of each of said arms slidably attached to a respective one of said rails, and said second end of each of said arms attached to said bucket.

3. The dumping apparatus of claim 1 wherein said hitch is attached to said bumper through a hole in said bumper.

4. The dumping apparatus of claim 1 wherein said hitch further comprises an upper portion that is vertically adjustably moveable with respect to a lower portion.

5. The dumping apparatus of claim 1 wherein said arm includes a first set of teeth, said bucket includes a second set of teeth, and said first set of teeth mesh with said second set of teeth as said bucket is raised and lowered.

6. The dumping apparatus of claim 1 wherein said first end of said arm includes locking means for preventing said bucket from lowering while insufficient tension is present on said cable.

* * * * *